United States Patent
Soodalter

[11] 3,868,048
[45] Feb. 25, 1975

[54] APPARATUS FOR DEPOSITING A FIRST FOOD SUBSTANCE UPON A SECOND FOOD PRODUCT

[76] Inventor: Arnold Soodalter, University Park Apartments Apt. M-1, Holyoke, Mass. 01040

[22] Filed: Jan. 14, 1974

[21] Appl. No.: 432,961

[52] U.S. Cl................ 222/380, 99/450.9, 417/457, 417/469
[51] Int. Cl............................................. B67d 5/48
[58] Field of Search............ 99/450.1, 450.4, 450.9; 222/262, 309, 377, 380, 385, 235; 417/457, 458, 469

[56] References Cited
UNITED STATES PATENTS

| | | | |
|---|---|---|---|
| 1,585,114 | 5/1926 | Rondohn | 99/450.4 |
| 1,801,414 | 4/1931 | Davis | 222/380 |
| 2,733,664 | 2/1956 | Saalfrank | 417/458 |
| 3,023,936 | 3/1962 | Marsh | 222/380 |
| 3,341,076 | 9/1967 | Wasilewski | 222/309 |
| 3,372,843 | 3/1968 | Soodalter | 222/380 |

Primary Examiner—Robert B. Reeves
Assistant Examiner—Thomas E. Kocovsky
Attorney, Agent, or Firm—Ross, Ross & Flavin

[57] ABSTRACT

Apparatus for dispensing a first food substance with respect to a second food substance, the former being held within a container and periodically charged therefrom through an adjacent transfer chamber in measured incremental amounts onto or into the latter. The apparatus consists of spring-loaded valve means in each of an inlet and an outlet of the transfer chamber, an air-actuated transfer cylinder having a double piston reciprocable within the container for opening one valve for drawing a charge of the first food substance from the container and into the transfer chamber and, simultaneous therewith, opening the other valve for expelling the charge from the transfer chamber to a nozzle, an air-actuated gate cylinder for closing the nozzle, means for controlling and synchronizing the movements of the transfer cylinder and gate cylinder according to the positioning of the second substance relative to the nozzle, and means within the container for maintaining a constant pressure upon the first food substance for directing the first food substance toward the piston.

2 Claims, 8 Drawing Figures

PATENTED FEB 25 1975

3,868,048

SHEET 1 OF 3

APPARATUS FOR DEPOSITING A FIRST FOOD SUBSTANCE UPON A SECOND FOOD PRODUCT The invention relates to apparatus for dispensing a measured amount of liquid, liquid pulp, pulp or liquid suspended solids, the dispensed material being injected into or deposited or sprayed or forcibly expelled upon another material or being dispensed directly into a receptacle, all as may be desired.

In the food processing field, a need has long been felt for a machine which can quickly, reliably and automatically dispense coating substances of various types and consistencies in controllable, predetermined, measured amounts.

I provide apparatus for dispensing a first substance of liquid or liquid pulp or pulp or liquid suspended solids onto a second substance or into a receptacle in controllable, predetermined, measured amounts and in timed conjunction with other related movements.

Figure 1:
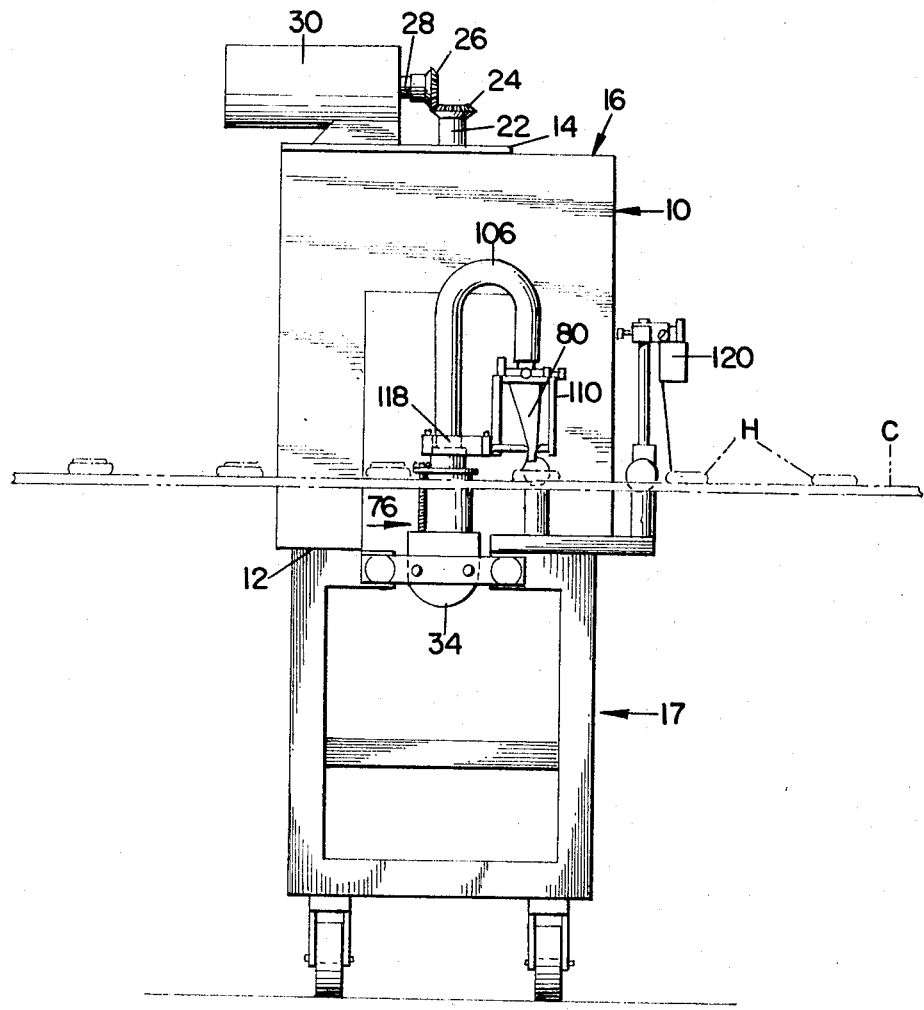
FIG. 1 is a view, in front elevation, of one exemplification of apparatus embodying the invention.
Figure 3:
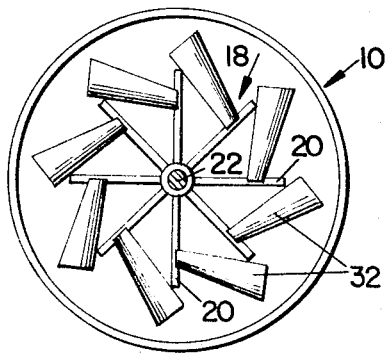
FIG. 3 is a view, in top plan, of the container of the apparatus, with parts removed for clarity.

The apparatus is designed primarily for applying a coating of one food substance upon, and/or mixing it with, another food substance and, while the seasoning or flavoring of meat products, (i.e. a viscous material coated upon a hamburg patty), is primarily envisioned, I do not by any means wish to be limited thereto.

The coating material may consist of any liquid, liquid pulp, pulp or liquid suspended solid, and may be in raw or cooked form and in either a hot or cold state.

The apparatus operates, in timed conjunction with the feeding thereto of the product to be coated or the receptacle to be filled, a conveyor or other means feeding the product or receptacle to a dispensing station whereat the dispensing of a measured, predetermined, adjustably controllable amount of the coating material ensues.

It includes a container for the temporary holding of the substance to be dispensed, a means for maintaining therewithin a constant pressure on that substance, a product transfer means for transferring the substance from the container to a dispensing nozzle or spreader, a means for feeding the product to be coated or the receptacle to be filled to the nozzle, and a means for controlling the nozzle opening and closing and hence the dispensing of the substance therefrom in timed relation with the movement of the product to be coated or the receptacle to be filled relative to the nozzle.

Container 10, which may be of cylindrical or other configuration, is closed at its bottom by a bottom wall 12, and is partially closed at its top as by a removable cover 14, the cover being of appropriate size as to provide a feed opening 16 for the introduction of the coating substance to the container interior.

Preferentially, the container is mounted upon a wheeled supporting structure 17 for mobility.

A pressure means 18, disposed within the container for exerting a downward pressure upon the coating substance and directing it toward a so-called product transfer means, includes a plurality of horizontally disposed arms 20 extendable radially-outwardly from adjacent the lower free end of a vertically disposed shaft 22 mounted centrally of the container. The upper end of the shaft is journalled in and extends outwardly through cover 14 and mounts a first bevel gear 24 thereon, which gear meshes with a second bevel gear 26 fixed to an output shaft 28 of a drive motor 30 also mounted on cover 14, and whereby the driving of the motor generates rotation of shaft 22 and arms 20.

Figure 4:
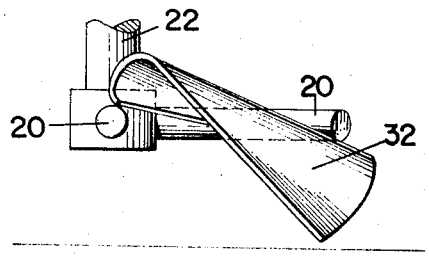
FIG. 4 is an enlarged, fragmentary view, in side elevation, of one of the pressure feed vanes.

Scoop-like vanes 32 extend between adjacent ones of the arms 20, being fixed at one end to the upper surface of one arm and being fixed at the opposite end to the lower surface of an adjacent arm (as shown in FIG. 4) so as to be curved and downwardly-directed, the vanes being disposed immediately above the upper surface of bottom wall 12 of container 10 by such unique configuration of vanes 32 and by their disposition relative to arms 20, upon rotation of shaft 22, the vanes move the coating substance within the container downwardly and toward the container center for action by the so-called product transfer means.

An arcuate piston housing 34 is provided centrally of and depends from bottom wall 12 of container 10, the piston housing providing a combination piston channel and product receiving space 36 below bottom wall 12.

A double piston 38 is provided on the inner free end of a piston rod 40 of an air cylinder 42, the piston being slidably disposed in piston channel 36.

Air cylinder 42 is mounted on an adjustable crossbrace 44 disposed outwardly of container 10, the crossbrace being movable relative to a pair of spaced, parallel support rails 46 extending outwardly from supporting structure 17.

A compression spring 58 sleeved on piston rod 40 is trapped between piston 38 and a collar 60 fixed to the piston rod rearwardly of the piston.

Figure 6:
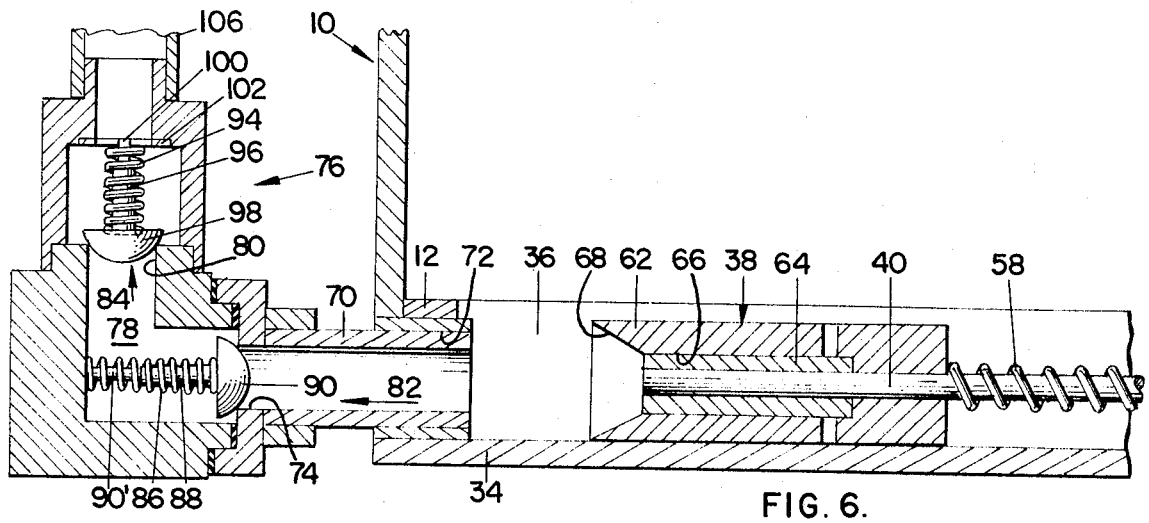
FIG. 6 is an enlarged, fragmentary view, in cross section, of the product transfer means in the closed or product non-feed position.
Figure 7:
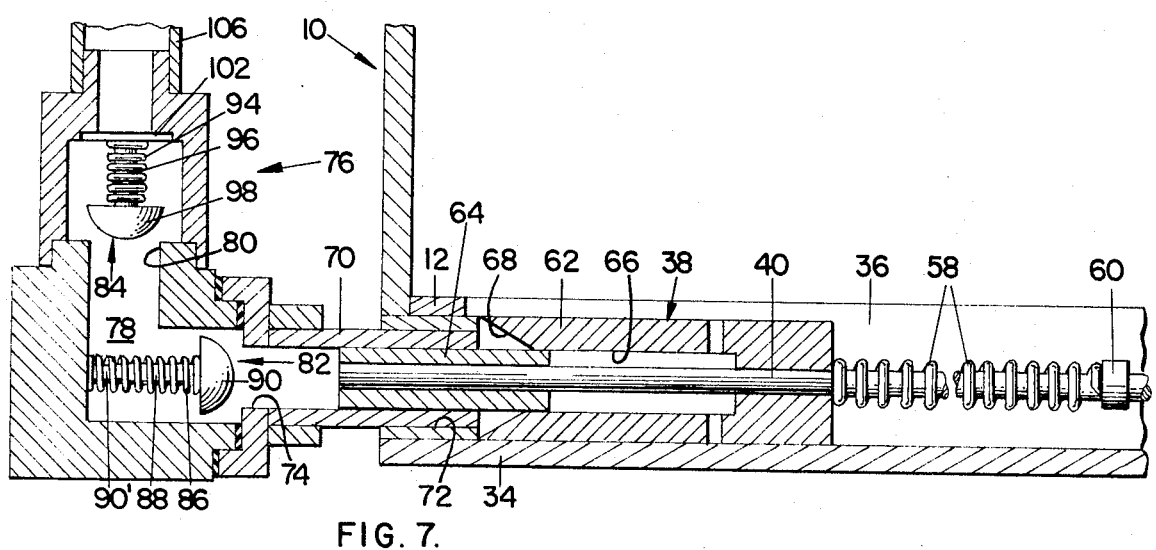
FIG. 7 is an enlarged, fragmentary view, in cross section of the product transfer means in an open or product feed position.

Piston 38, best seen in FIGS. 6 and 7, comprises an outer or primary piston 62 which sleeves an inner or secondary piston 64, the latter being fixed to the inner end of piston rod 40 and being slidable within an annular bore 66 extending inwardly from a frusto-conical opening 68 in one end of the outer or primary piston.

Bolts 48 extend downwardly through slots 50 in rails 46 and through cross-brace 44, the bolts having nuts, not shown, threaded thereon, for locking the cross-brace and air cylinder relative to the support rails.

Figure 5:
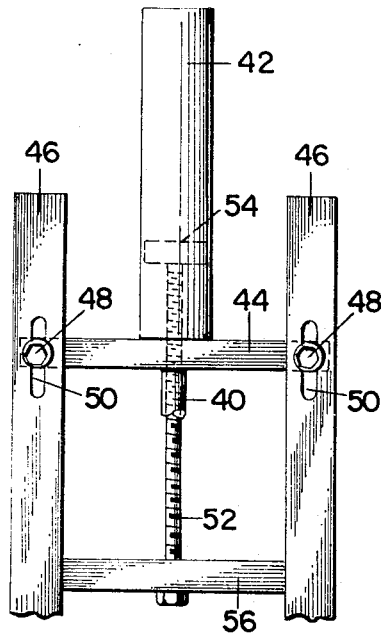
FIG. 5 is an enlarged, fragmentary view, in top plan, of the transfer cylinder support structure.
Figure 2:
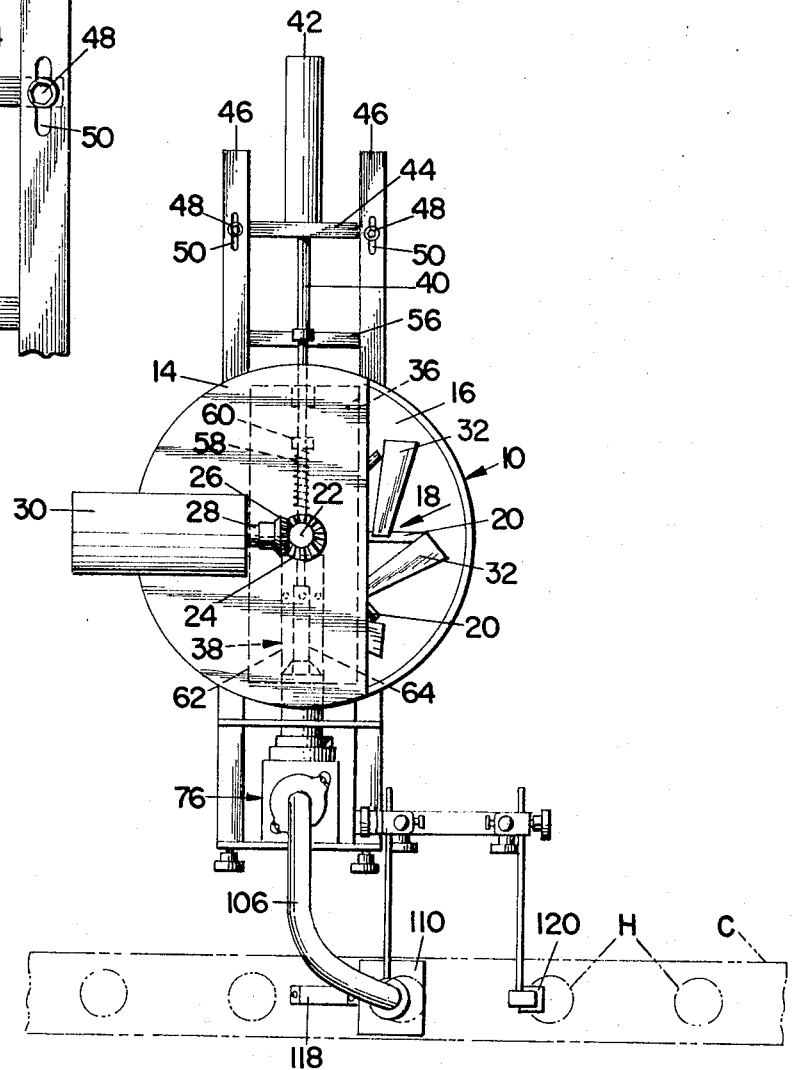
FIG. 2 is a view of the FIG. 1 apparatus, in top plan.

Linear movement of the cross-brace and air cylinder may be effected after first loosening bolts 48 by rotation of a jack screw 52 (see FIG. 5) which is threaded at one end in a boss 54 depending from the air cylinder, the jack screw being threaded at its opposite end in a support bar 56 extendable between and fixed to support rails 46.

Piston 38 is driven within channel 36 by cylinder 42 toward a product exit line 70 which is fixed at one end in an exit opening 72 in container 10 and at its opposite end in an entrance opening 74 in a product transfer housing 76.

The primary and secondary pistons drive the product within the channel 36 toward exit opening 72. Travel of primary piston 62 ceases when it contacts exit line 70. However, travel of secondary piston 64 continues into the exit line to drive the product through the exit line and into entrance opening 74 of product transfer housing 76 (as shown in FIG. 7).

The transfer housing has a transfer chamber 78 therein, one end of which communicates with entrance opening 74 and the other end of which communicates with an exit opening 80, entrance opening 74 being controlled by a mushroom-type valve 82, with a similar mushroom-type valve 84 controlling exit opening 80.

Mushroom valve 82 seats in entrance opening 74 and is urged into seating engagement by a compression spring 86, sleeving a tubular extension 88 formed integrally with and extending outwardly from the flat surface of the hemispherical valve body 90.

Tubular extension 88 is slidable relative to a pin 92 extendable outwardly from a wall of transfer chamber 78.

One end of spring 86 engages the flat surface of valve body 90 and the opposite end thereof engages the wall of transfer chamber 78, wherefore the spring urges the valve into seating position relative to entrance opening 74.

Mushroom valve 84 seats in exit opening 80 and is urged into seating engagement by a compression spring 94, sleeving a tubular extension 96 formed integrally with and extending outwardly from the flat surface of the hemispherical valve body 98.

Tubular extension 96 is slidable relative to a pin 100 extendable outwardly from a retainer ring 102 secured in a boss 104 fixed to transfer housing 76, the boss having the lower end of a flexible hose 106 sleeved thereon.

One end of spring 94 engages the flat surface of valve body 98 and the opposite end thereof engages disc 102, wherefore the spring urges valve 84 into seating position relative to exit opening 80.

The pressure exerted by the product against the valves is such as to move them out of seated engagement with the entrance and exit openings in the transfer housing, thus to permit the product to pass through the transfer housing and boss. With this pressure removed, the springs return the valves to their seating position.

A heavier compression spring is employed in the case of valve 84 than in the case of valve 82, ergo valve 84 will not be opened by the product pressure within transfer chamber 78, but rather will open only when piston 38 exerts added pressure upon the product.

The material passes from the transfer housing and boss via hose 106 to a nozzle or dispensing head 108 for dispensing therefrom upon such as hamburg patties H being transported below the nozzle by a conveyor means C.

Nozzle 108 of the dispensing head may be fixed in a vertically-depending manner by means of a bracket 110 so that the lower end of the nozzle will be spaced above the conveyor. The nozzle is tubular and preferably formed from a resilient compressible rubber or plastic material so that the lower end thereof may be readily opened and closed off selectively, as desired.

Figure 8:
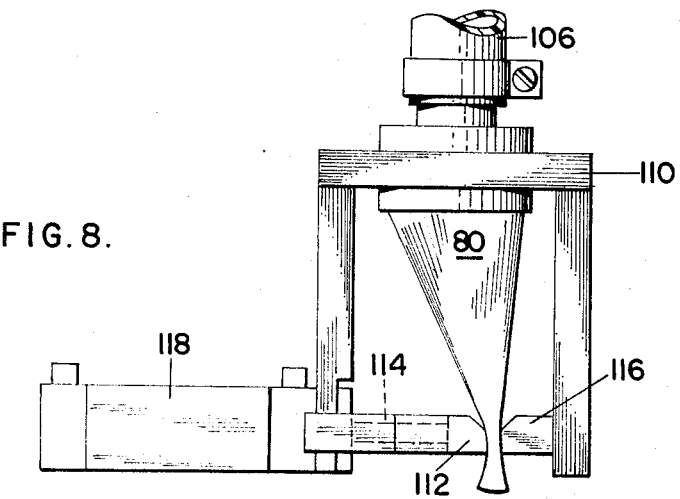
FIG. 8 is an enlarged, fragmentary view, in front elevation, of the nozzle and nozzle control means.

The means for closing the nozzle lower end, best seen in FIG. 8, comprises a gate 112 fixed to the outboard end of a piston rod 114 of a horizontally-disposed gate cylinder 116 mounted on bracket 110. Gate 112 is aligned with an anvil block 118 provided on bracket 110, with the lower end of the nozzle being disposed between the gate and anvil block.

On the forward stroke of the piston of the gate cylinder, the gate is moved horizontally inwardly and the lower end of the nozzle is pinched or pressed between the gate and the anvil so as to close off the nozzle. On the retrograde stroke of the gate cylinder piston, the gate is moved away from the nozzle and the nozzle opens automatically due to its inherent resiliency and due to the pressure of the material being charged therethrough.

Signal means is provided forwardly of the nozzle for indicating the presence on the conveyor of a product to be coated or receptacle to be filled and comprises an electroswitch 120 disposed in the path of the product being served and adapted to be contacted thereby to signal gate cylinder 116 to open nozzle 108 and to signal air cylinder 42 to send piston 38 forwardly on its pressure stroke to drive the coating product from the container and through the transfer housing and flexible hose to the nozzle.

I claim:

1. Apparatus for transferring measured increments of a first food substance with respect to and in timed relation with the stop and go operating cycle of a second food substance handling machine dispensing increments of a second food substance comprising:
   a. a container for containing a quota of the first food substance;
   b. a dispensing head for dispensing increments of the first food substance with respect to dispensed increments of the second food substance;
   c. a transfer housing intermediate and communicating with the container and dispensing head;
   d. a piston reciprocally receivable within the container for transferring the first food substance from the container through the transfer housing to the dispensing head;
   e. an air cylinder for loading the piston and imparting thereto a feeding stroke in one direction and a non-feeding stroke in counter direction;
   f. control means for alternately controlling the actuation of the air cylinder in feeding and non-feeding strokes responsively to the stop and go movements of the second food substance handling machine;
   g. a first pressure-operable by-pass valve disposed between the dispensing head and transfer housing and operative by a spring of relatively great tension and being in a normally-closed position with respect to communication between the transfer housing and dispensing head;
   h. a second pressure-operable by-pass valve disposed between the container and transfer housing and operative by a spring of relatively small tension and being in a normally-closed position with respect to communication between the transfer housing and container;
   i. the second by-pass valve on the retrograde stroke of the piston being opened by the pressure of the first food substance for permitting the passage thereof into the transfer housing with the first by-pass valve being closed by the spring of relatively great tension;
   j. the second by-pass valve on the pressure stroke of the piston being opened and the first by-pass valve being opened by the pressure of the first food substance for permitting the passage thereof from the transfer housing to and through the dispensing head and onto the second food substance; and k. means for exerting continual pressure upon the first food substance within the container for moving the first food substance into the path of the piston comprising a cluster of vanes rotatably mounted and vertically reciprocable within the container.

2. In the apparatus of claim 1, wherein the piston comprises a primary piston sleeving a secondary piston, the secondary piston exerting a supplemental force upon the first food substance for transferring the first food substance from the container.

* * * * *